E. McCONVILLE.
RESILIENT WHEEL.
APPLICATION FILED DEC. 6, 1920.

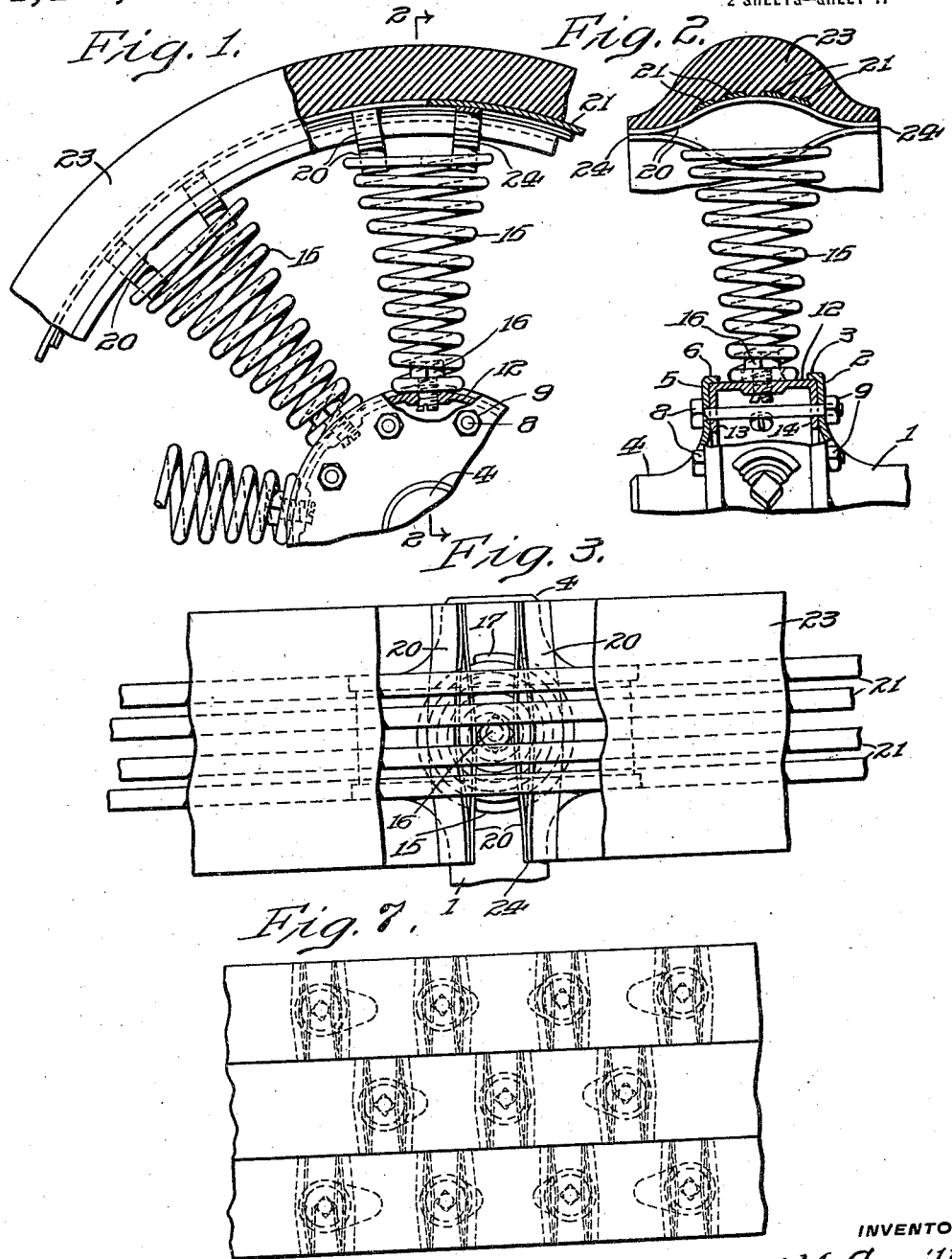

1,418,723.

Patented June 6, 1922.
2 SHEETS—SHEET 2.

INVENTOR
Edward McConville.

WITNESS
F. J. Hartman.

BY
ATTORNEYS

UNITED STATES PATENT OFFICE.

EDWARD McCONVILLE, OF PHILADELPHIA, PENNSYLVANIA.

RESILIENT WHEEL.

1,418,723.   Specification of Letters Patent.   Patented June 6, 1922.

Application filed December 6, 1920. Serial No. 428,434.

*To all whom it may concern:*

Be it known that I, EDWARD McCONVILLE, a citizen of the United States, and a resident of the city of Philadelphia, county of Philadelphia, and State of Pennsylvania, have invented certain new and useful Improvements in Resilient Wheels, of which the following is a specification, reference being had to the accompanying drawings.

A principal object of my invention is to provide a wheel embodying resilient means interposed between the tire and the hub so that a solid tire of rubber or other suitable material may be employed without sacrificing the resiliency and flexibility requisite in a wheel intended for use on automobiles, trucks and similar vehicles. Further objects of my invention are to provide a wheel of the character aforesaid which embodies means for absorbing and distributing the lighter shocks due to small irregularities in the surface over which the wheel is traveling, as well as means for absorbing and distributing the heavier blows and shocks arising from more marked irregularities in the road surface so that by properly proportioning and arranging said means which supplement and coact with each other in conformity with the particular kind of road surface over which the wheel is traveling, a wheel having extremely good riding qualities may be produced.

Still further objects of my invention are to provide a resilient wheel having a relatively small number of parts and those of simple design and construction, which is adapted for use on different types of vehicles, is not liable to get out of order or become damaged through hard usage and which may be constructed at a moderate cost.

My invention further includes all of the other various objects and novel features of construction and arrangement hereinafter more definitely specified and described.

Figure 4:
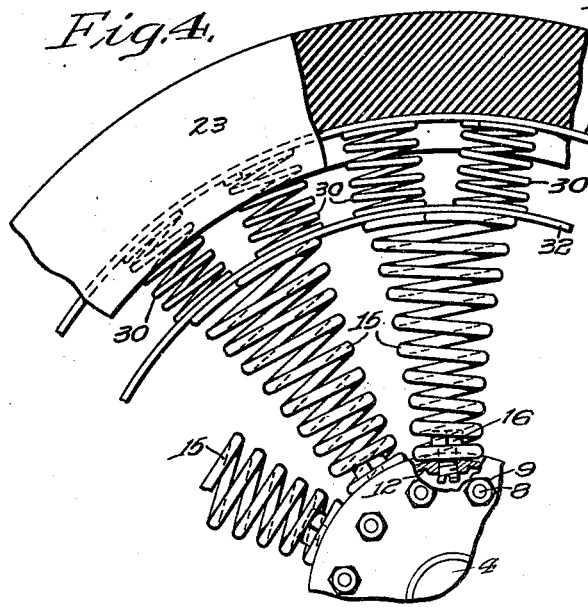
Figure 5:
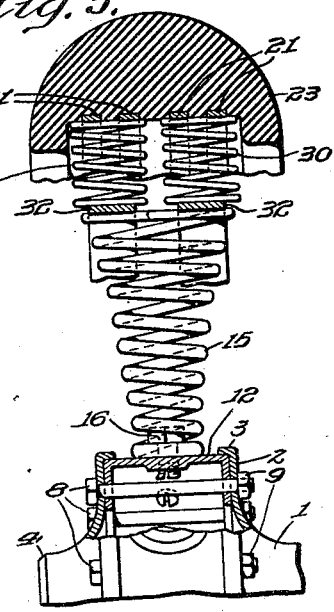
Figure 6:
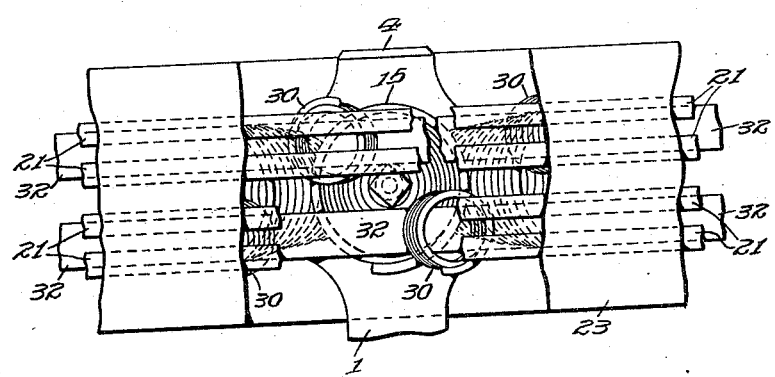

In the accompanying drawing I have illustrated certain embodiments of my invention suitable for use on automotive vehicles, one of the said forms shown in Figs. 1 to 3 inclusive being particularly adapted for relatively light vehicles of that character, such as pleasure cars, and the other shown in Figs. 4 to 6 inclusive being ordinarily more suitable for employment on trucks or other heavy vehicles, although the use of the said forms is not in any way restricted to any particular class of vehicles as either form may be utilized with any type of vehicle as may be desired.

In the said drawings, Fig. 1 is a fragmentary side elevation of the wheel partially in central vertical section; Fig. 2 is a vertical section on line 2—2 in Fig. 1, and Fig. 3 a fragmentary top plan view of the wheel, a portion of the tire being broken away for the sake of clearness. In Figs. 4, 5 and 6 a slightly modified form of the invention is shown which is particularly adapted for use in connection with the heavier types of vehicles, these three figures respectively corresponding to Figs. 1 to 3 inclusive already described. In Fig. 7 I have shown somewhat diagrammatically a fragmentary top plan view of a plurality of wheel units of the form shown in Figs. 1 to 3 arranged side by side and connected together so as to provide a wheel having a relatively wide tread and of great strength which is particularly adapted for use on very heavy trucks and the like. Similar numerals are used to denote corresponding parts in the several figures.

Referring now more particularly to that form of the invention shown in Figs. 1 to 3 inclusive, the same comprises a member 1 having a peripheral flange 2 preferably provided with an inwardly turned lip 3. A cap 4 having a similar flange 5 and lip 6 is provided and secured in assembled relation with the member 1 by a plurality of transversely extending bolts 8 which pass through suitable holes in the flanges and are provided with nuts 9 adapted to be drawn up against the outer face of one of the flanges, preferably flange 2. The member 1, it will be understood, is carried by the axle of the vehicle, being either arranged to rotate therewith in case the wheel is one of the driving wheels or to rotate relatively to the axle in case the wheel is not intended to turn therewith, the particular connection between the member and the axle or the arrangement of the bearings by which the member is supported on the axle forming no part of the present invention.

Positioned between the flanges is a preferably flat ring 12 having inwardly directed annular peripheral flanges 13 and 14 provided with holes for the passage of the bolts 8, the external diameter of the ring corresponding to the internal diameter of the lips 3 and 6 so that when the ring is positioned between the member 1 and cap 4, its outer surface will contact with the under side of the lips, thus forming a tight joint at this point, preventing the entrance of dust and dirt and assisting in holding the ring in operatively rigid relation with the cap and member 1. If desired, however, other suitable means may be employed for holding the ring or equivalent member in position.

Disposed about the ring, seated thereon and extending radially outwardly therefrom, are a plurality of coil springs 15 which in effect form the spokes of the wheel, and while these springs may be of any suitable construction I prefer to graduate them in diameter outwardly from the hub and also to progressively diminish the thickness of the material from which they are made in such manner that the cross sectional diameter of the material adjacent the hub is greater than adjacent the rim of the wheel. Each spring is preferably removably secured to the ring adjacent the point where it rests thereon in any suitable manner, preferably by coiling the last convolution of the spring into a decreasing spiral lying in a single plane normal to the axis of the spring so as to provide a substantially axially positioned eye adapted for the passage of a cap screw or bolt 16 which is threaded through the ring and locked thereto in any suitable manner, preferably by transversely slitting the end of the bolt prior to its insertion in the ring and thereafter spreading the projecting ends slightly as clearly shown in Figs. 1 and 2. Under these conditions the bolt is prevented from working out of the rim but may be readily removed therefrom when desired by pinching the expanded ends together prior to unscrewing the bolt.

The outer end of each spring 15 is also preferably arranged to present a substantially flat seat, conveniently by winding the last convolution so that it will lie substantially in a single plane normal to the axis of the spring, after which the extreme end 17 of the spring is preferably electrically welded or otherwise secured to the adjacent convolution, as best shown in Fig. 3, and adjacent each of the springs 15 and supported thereby are positioned other additional springs 20 which serve through the medium of interposed peripheral bands 21 to support the tire 23 as hereinafter more particularly described, and which for convenience I therefore term "supporting springs." In the form of the invention shown in Figs. 1 to 3 inclusive the supporting springs 20 are preferably of elliptical form and are arranged in spaced relation on opposite sides of the axis of spring 15 and with their major axes extending transversely of the wheel, that is, in parallel relation with its axis of rotation, two springs being preferably provided for each of the springs 15 and secured adjacent thereto in any suitable manner, preferably by electrically welding each of them to the last convolution of the adjacent spring 15, although if desired other means may be employed for this purpose. When a pair of springs 20 is employed in connection with each of the springs 15, I prefer to arrange the former in spaced relation on each side of the axis of the latter as clearly shown in Fig. 1, and to so proportion the various parts that the center of the base of each supporting spring will lie slightly below the plane of the end of its spring 15 between the points at which it is secured to the last convolution thereof. It will be understood, of course, that the upper and lower members of each of the springs 20 are secured together adjacent their ends as at 24 by electrical welding or in any other suitable way, the overall length of each of said springs being preferably equal to the width of the tire 23.

The several supporting springs 20 are connected together by one or more annular bands 21 extending around the springs, contacting with their outer surfaces and electrically welded or otherwise secured thereto, and to these bands, which are somewhat flexible, as well as to springs 20 if desired, the tire 23, which may be of rubber or other suitable material, is firmly secured preferably by vulcanizing, so that the bands form substantially an integral part of, and support for, the tire.

In the form of the invention shown in Figs. 4, 5 and 6, instead of utilizing the transversely positioned elliptic supporting springs adjacent the ends of each of the springs 15 I provide a plurality of coil springs 30, the ends of each of which are preferably arranged to lie in a single plane so as to form seats in the manner already described, and arrange these springs so that their outer ends abut against and are welded to the annular bands 21 and their inner ends against one or more hoops 32 which are seated on the outer ends of the springs 15 and welded or otherwise secured thereto, the inner ends of the springs 30 being similarly secured to the outer faces of the hoops.

It will be understood that while in the drawings I have shown a pair of supporting springs supported by each of the larger springs 15, I am not limited solely to the use of that number, but on the contrary in certain constructions a greater or less number of springs may be employed and positioned at suitable points with relation to the periphery of the end of each spring 15. When but two of the springs 30 are used in connection with each of the springs 15 I prefer to dispose them at diametrically opposite points on the periphery of the end thereof and upon a diameter of the latter angularly disposed with respect to the axis of rotation of the wheel, so that in the completed wheel the springs 30 will lie in staggered relation beneath the tire 23.

With a wheel constructed substantially as hereinbefore described, a shock, due to the wheel encountering an obstacle in the road or an inequality in the road surface, is transmitted first to the springs 20 or 30, as the case may be, and largely absorbed by them unless the shock be of considerable magnitude, in which case the springs 15 come into play and cooperate with the springs 20 or 30 in absorbing and dissipating the shock. It will be understood that the strength of the several springs should be designed with regard to the normal load which the wheel is intended to carry and that by making the springs 20 or 30 more flexible than the springs 15 the former in greater part take care of the small shocks received by the tire, so that the wheel is adapted for satisfactory operation over surfaces of varying character and embodies the desired resiliency and flexibility without sacrificing the requisite stiffness and ability to support a required weight.

Under certain conditions of operation where an extremely strong construction having a wide tread is required, as in the case of extremely heavy trucks and similar vehicles, a plurality of the wheel units, for example three, may be placed side by side, as shown in Fig. 7 and suitably connected, preferably adjacent their hubs, so as to revolve unitarily, each of the units however operating independently so far as its resilient or spring action is concerned, which is a matter of considerable importance and advantage in permitting the several units forming the tread of the wheel to independently accommodate themselves to inequalities in the road surface.

While I have herein described certain forms of my invention with considerable particularity I do not thereby desire or intend to limit myself specifically thereto, as suitable changes and modifications may be made in the design, construction and arrangement of the details of the several elements and a greater or less number of springs than that shown in the drawings may be employed and the configuration and arrangement thereof varied as required, without departing from the spirit and scope of the invention as defined in the appended claims.

Having thus described my invention, I claim and desire to protect by Letters Patent of the United States:

1. A resilient wheel comprising a hub portion, a plurality of radially disposed springs extending outwardly from said hub portion, a spring seated adjacent the outer extremity of each of said radial springs, a tire, and flexible means connecting the second mentioned springs and the tire to support the latter.

2. A resilient wheel comprising a hub portion, a plurality of radially disposed coil springs extending outwardly therefrom, a plurality of relatively lighter springs seated adjacent the outer extremity of each of said radial springs, a tire, and flexible means connecting the relatively lighter springs and the tire to support the latter.

3. A resilient wheel comprising a hub portion, a plurality of springs extending radially outward therefrom, a pair of relatively lighter springs seated on the end of each of said radial springs, a flexible band encircling said pairs of springs, and a tire secured to and supported by said band.

4. A resilient wheel comprising a hub portion, a plurality of radially disposed springs extending outwardly from said hub portion, a spring seated adjacent the outer extremity of each of said radial springs, a plurality of annular flexible bands connected to said last mentioned springs, and a tire secured to and supported by said bands.

5. A resilient wheel comprising a hub portion, a plurality of radially disposed springs extending outwardly from said hub portion, each of said springs graduating in diameter outwardly from the hub and also progressively diminishing in thickness of material so as to render the material of the springs adjacent the hub of greater diameter than the diameter of the material of the coils at the outer ends of the springs, the innermost coil of each spring lying in a plane normal to the axis of the spring and providing a securing eye, means passing through the respective eyes of the springs into the hub to secure the springs to the hub, the outermost coil of each spring lying substantially in a single plane normal to the axis of the respective spring with the extreme outer end of the spring secured to the adjacent convolution of the respective spring, a spring device connected to the outer convolution of each of said springs, and a tire supported from said spring devices.

6. A resilient wheel comprising a hub portion, a plurality of radially disposed coil springs extending outwardly from said hub portion, the thickness of the material of which each spring is formed gradually diminishing in thickness outwardly from the hub to render the cross sectional diameter of the material adjacent the hub greater than the diameter of the material at the outer ends of the springs, a spring seated against the outer extremity of each of said radial springs, and a tire supported from said last mentioned springs.

In witness whereof, I have hereunto set my hand this first day of December, 1920.

EDWARD McCONVILLE.